US012619468B2

(12) United States Patent (10) Patent No.: US 12,619,468 B2
Shelley et al. (45) Date of Patent: May 5, 2026

(54) HARDWARE INTEGRATED, PRIORITY-ENCODED DOMAINS

(71) Applicant: NXP USA, INC., Austin, TX (US)

(72) Inventors: Gareth Owen Shelley, San Jose, CA (US); David McDaid, San Jose, CA (US); Steven Bruce McAslan, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 665 days.

(21) Appl. No.: 18/067,446

(22) Filed: Dec. 16, 2022

(65) Prior Publication Data

US 2024/0202038 A1 Jun. 20, 2024

(51) Int. Cl.
*G06F 9/50* (2006.01)
*G06F 9/455* (2018.01)
*H04L 9/40* (2022.01)

(52) U.S. Cl.
CPC ........ *G06F 9/5038* (2013.01); *G06F 9/45558* (2013.01); *G06F 9/5027* (2013.01); *H04L 63/102* (2013.01)

(58) Field of Classification Search
None
See application file for complete search history.

(56) References Cited

U.S. PATENT DOCUMENTS 9,594,592 B2 3/2017 Challa et al.
9,600,339 B2 3/2017 Challa et al.
10,534,641 B2 1/2020 Obara et al.

2014/0165216 A1* 6/2014 Kwag ..................... G06F 21/74
726/30
2016/0328254 A1* 11/2016 Ahmed ............... G06F 9/45545
2016/0328272 A1 11/2016 Ahmed et al.
2017/0177415 A1* 6/2017 Dhanraj ................ G06F 9/5044
2022/0164212 A1 5/2022 McDaid et al.

FOREIGN PATENT DOCUMENTS

CN 102253857 A 11/2011
CN 111586651 A 8/2020

OTHER PUBLICATIONS

Diego Ongaro, et al., "Scheduling I/O in Virtual Machine Monitors," VEE '08: Proceedings of the Fourth ACM SIGPLAN/ SIGOPS International Conference on Virtual Execution Environments, Mar. 2008, pp. 1-10, https://doi.org/10.1145/1346256. 1346258.

* cited by examiner

*Primary Examiner* — Qing Yuan Wu

(57) ABSTRACT

Systems and methods for priority encoded domains in an SoC have been described. In an illustrative, non-limiting embodiment, a processing system in an SoC, may include: a core, and a domain access controller coupled to the core. The domain access controller may be configured to: receive a resource transaction request from a master device associated with a software-defined processing domain, and process the resource transaction request based upon a priority level of the software-defined processing domain. The domain access controller may also order a plurality of resource transaction requests based upon the associated respective priority levels, and provide the resource transaction requests to resources based on the order. A hypervisor can also use the priority levels of the software-defined processing domains to allocate a plurality of virtual machines to a plurality of processing cores according to the priority levels.

18 Claims, 13 Drawing Sheets

THE DOMAIN PRIORITY LEVELS, AS PROGRAMMED IN THE NEW REGISTERS

| DID | MDPL | PRIORITIZED |
|---|---|---|
| 0 | 2 | DID5 (0) |
| 1 | 4 | DID7 (1) |
| 2 | 3 | DID0 (2) |
| 3 | 6 | DID2 (3) |
| 4 | 5 | DID1 (4) |
| 5 | 0 | DID4 (5) |
| 6 | 7 | DID3 (6) |
| 7 | 1 | DID6 (7) |
| 8 | 11 | DID15 (8) |
| 9 | 12 | DID10 (9) |
| 10 | 9 | DID13 (10) |
| 11 | 14 | DID8 (11) |
| 12 | 13 | DID9 (12) |
| 13 | 10 | DID12 (13) |
| 14 | 15 | DID11 (14) |
| 15 | 8 | DID14 (15) |

810

0=HIGHEST PRIORITY
15=LOWEST PRIORITY

ORIGINAL ACTIVE TASK STATUS

| CORE | DID | MDPL | SDPL |
|---|---|---|---|
| 0 | 5 | 0 | 8 |
| 3 | 0 | 2 | 11 |
| 1 | 2 | 3 | 15 |
| 2 | 6 | 7 | 0 |

811

WAITING TASK: DID4, MDPL5, SDPL5

NEW ACTIVE TASK STATUS

| CORE | DID | MDPL | SDPL |
|---|---|---|---|
| 0 | 5 | 0 | 8 |
| 3 | 0 | 2 | 11 |
| 1 | 2 | 3 | 15 |
| 2 | 4 | 5 | 5 |

812

THE DOMAIN PRIORITY LEVELS, AS PROGRAMMED IN THE NEW REGISTERS

| DID | MDPL | | PRIORITIZED |
|---|---|---|---|
| 0 | 2 | | DID5 (0) |
| 1 | 4 | | DID7 (1) |
| 2 | 3 | | DID0 (2) |
| 3 | 6 | | DID2 (3) |
| 4 | 5 | | DID1 (4) |
| 5 | 0 | | DID4 (5) |
| 6 | 7 | | DID3 (6) |
| 7 | 1 | | DID6 (7) |
| 8 | 11 | | DID15 (8) |
| 9 | 12 | | DID10 (9) |
| 10 | 9 | | DID13 (10) |
| 11 | 14 | | DID8 (11) |
| 12 | 13 | | DID9 (12) |
| 13 | 10 | | DID12 (13) |
| 14 | 15 | | DID11 (14) |
| 15 | 8 | | DID14 (15) |

810

ORIGINAL ACTIVE TASK STATUS

| CORE | DID | MDPL | SDPL |
|---|---|---|---|
| 3 | 4 | 5 | 0 |
| 2 | 10 | 9 | 0 |
| 1 | 13 | 10 | 3 |
| 0 | 13 | 10 | 5 |

821

WAITING TASK: DID15, MDPL8, SDPL9

NEW ACTIVE TASK STATUS

| CORE | DID | MDPL | SDPL |
|---|---|---|---|
| 3 | 4 | 5 | 0 |
| 0 | 15 | 8 | 9 |
| 2 | 10 | 9 | 0 |
| 1 | 13 | 10 | 3 |

822

0=HIGHEST PRIORITY
15=LOWEST PRIORITY

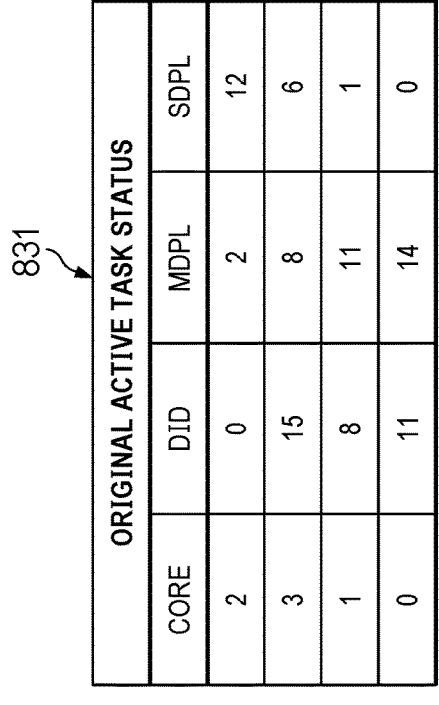
831 — ORIGINAL ACTIVE TASK STATUS
| CORE | DID | MDPL | SDPL |
|---|---|---|---|
| 2 | 0 | 2 | 12 |
| 3 | 15 | 8 | 6 |
| 1 | 8 | 11 | 1 |
| 0 | 11 | 14 | 0 |
WAITING TASK: DID14, MDPL15, SDPL0
832 — NEW ACTIVE TASK STATUS
| CORE | DID | MDPL | SDPL |
|---|---|---|---|
| 2 | 0 | 2 | 12 |
| 3 | 15 | 8 | 6 |
| 1 | 8 | 11 | 1 |
| 0 | 11 | 14 | 0 |
FIG. 8C
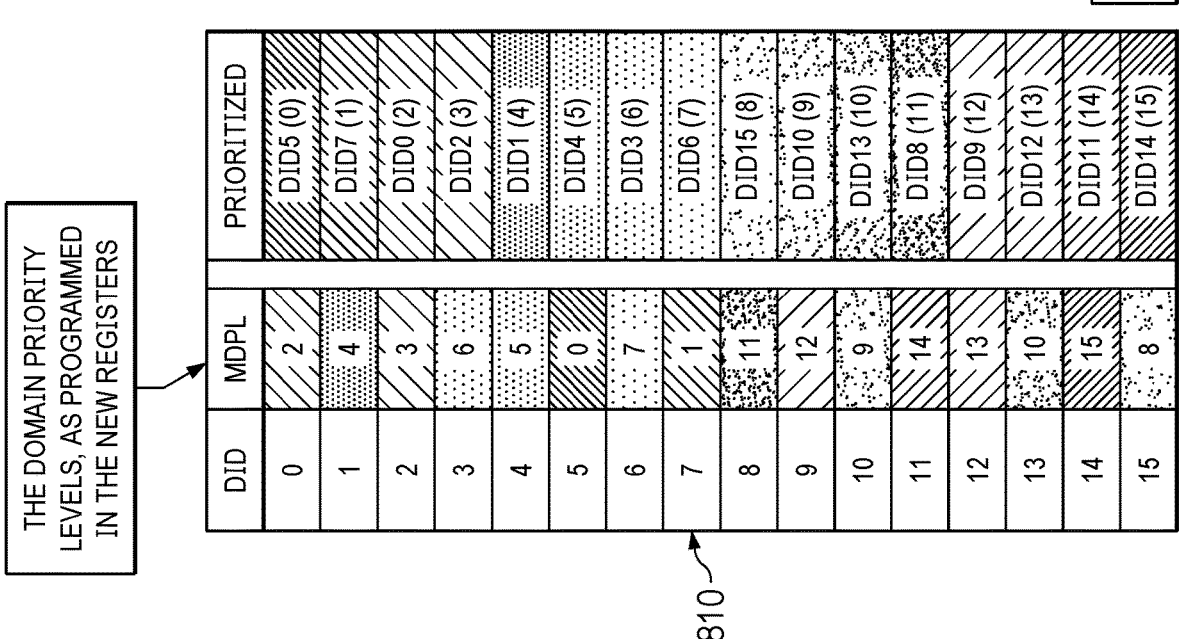
THE DOMAIN PRIORITY LEVELS, AS PROGRAMMED IN THE NEW REGISTERS — 810
| DID | MDPL | PRIORITIZED |
|---|---|---|
| 0 | 2 | DID5 (0) |
| 1 | 4 | DID7 (1) |
| 2 | 3 | DID0 (2) |
| 3 | 6 | DID2 (3) |
| 4 | 5 | DID1 (4) |
| 5 | 0 | DID4 (5) |
| 6 | 7 | DID3 (6) |
| 7 | 1 | DID6 (7) |
| 8 | 11 | DID15 (8) |
| 9 | 12 | DID10 (9) |
| 10 | 9 | DID13 (10) |
| 11 | 14 | DID8 (11) |
| 12 | 13 | DID9 (12) |
| 13 | 10 | DID12 (13) |
| 14 | 15 | DID11 (14) |
| 15 | 8 | DID14 (15) |
0=HIGHEST PRIORITY
15=LOWEST PRIORITY

HARDWARE INTEGRATED, PRIORITY-ENCODED DOMAINS

FIELD

The present disclosure relates generally to computer architectures and, more particularly, to virtualization and priority of resources in a processing device.

BACKGROUND

In a data processing system, various resources, such as bus masters, memory devices, and peripherals, can be grouped into common domains. Each group can be referred to as a resource domain and can include one or more data processors, memory devices, and peripheral devices.

Applications are executed by a processor whose execution is controlled by an operating system. The operating system interfaces directly with the hardware components of the processor and the hardware components coupled to the processor. In this configuration, if another operating system, such as another instance of an operating system, is needed, another processor and hardware components would be added to the configuration.

In an attempt to reduce the costs, particularly hardware costs, some systems employ virtualization techniques by sharing the hardware with multiple instances of an operating system, or different operating systems. In one such system, a host operating system runs multiple instances of child operating systems or two or more different operating systems. Virtualization is performed by a host process, referred to as a hypervisor, that allows multiple instances of child operating systems to share a single processor and virtualized hardware resources. The hypervisor enables general freedom of interference: i.e. application X cannot influence application Y. and may also isolate the applications from one another, such that a failure in one application does not cause a failure in the other applications or the hardware platform.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

FIGS. 4A and 4B illustrates a block diagram of some components in an SoC, with some of the components grouped into two domains, according to some embodiments.

FIGS. 8A, 8B, and 8C illustrate context switch policing examples for potentially swapping higher priority tasks for current active tasks at processing cores, according to some embodiments.

DETAILED DESCRIPTION

Figure 1:
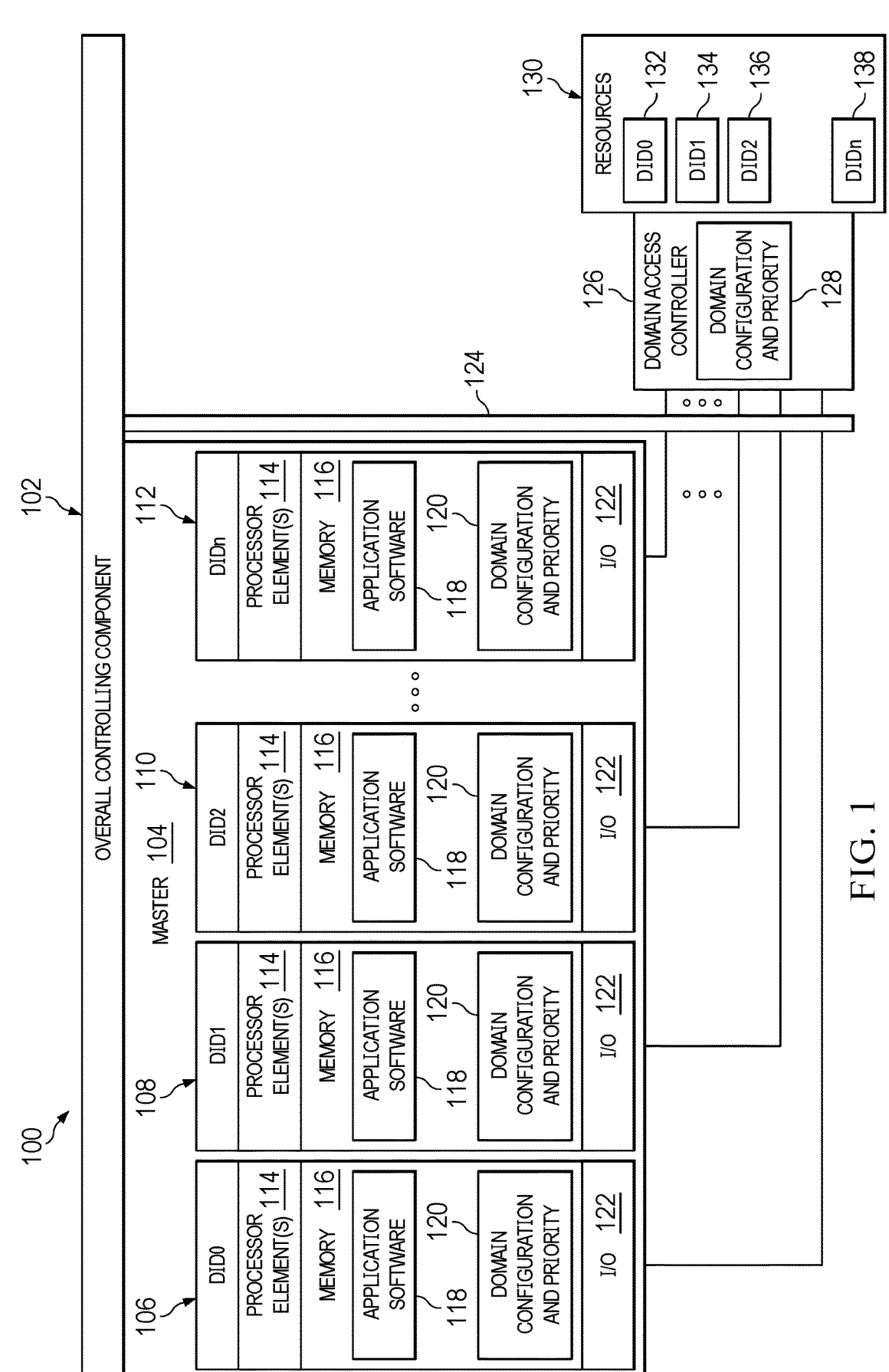
FIG. 1 illustrates a block diagram of a processing system in accordance with selected embodiments of the invention.

Some embodiments of the hardware integrated priority encoded domains provide an extension for extended Resource Domain Controller ("XRDC"). The XRDC is a configurable module that allows the creation of software defined processing domains, that are enforced by hardware on a device. In some embodiments disclosed herein, the domains are used by a multi-core master device to provide partitioning and protection configuration across an interface. The domain identifiers can be used by software components, such as virtual machines or applications, in the master device. These domain identifiers can also be provided to a domain access controller for access to other components on an SoC, such as memory, as well as peripherals. The domain access controller interprets the incoming messages and allows access to the corresponding internal or external components by messages that match the domain identifier and access permissions of the corresponding component.

In some embodiments, an overall controlling component, such as a hypervisor or operating system, can have the highest privilege of all hardware or software being executed by the master device. During startup or reboot, the overall controlling component is activated, before any other functions, to read domain configuration files that identify the internal or external resources, including peripheral devices, included in each domain. The domain information is provided to other lower privilege components (such as virtual machines in the case of a hypervisor, or applications in the case of an operating system) in the master device, as well as to a domain access controller for the internal or external resources, such as the peripheral devices. The domain access controller can be implemented as a standalone component coupled between the master device and the internal/external resources, or as part of the internal/external resources themselves. The overall controlling component (such as the hypervisor or operating system) communicates directly with the domain access controller through a system interconnect during startup or reboot of the processing system. By assigning the internal/external resources to a domain as part of the very first functions performed during startup, the likelihood of corrupting the domain configurations decreases, for example, by preventing one domain from accessing resources that are only intended to be allocated to another domain.

In some embodiments, each master has its own Master Domain Assignment Controller ("MDAC") register that can programmed with these XRDC attributes: the Domain Identifier (DID), the Privileged Attribute ("PA"), the Secure Attribute ("SA"), a Master Domain Priority Level ("MDPL") and a Sub Domain Priority Level ("SDPL"). These XRDC attributes are added to a memory transaction initiated by that master and checked at the memory, by a Memory Region Controller ("MRC"), or at a peripheral, by a Peripheral Domain Access Controller ("PAC"), to ensure that the transaction has the required permissions. With this flexible programming model, it is possible for resources to be shared by multiple Domains, and therefore a single master can be common to more than one Domain.

During a transaction involving the XRDC, according to some embodiments, a master (such as a virtual machine or an application) provides a transaction to a MDAC, which adds XRDC attributes to the transactions. The transaction is routed to the appropriate MRC or PAC. The PAC or MRC examines the XRDC attributes and determines if the access allowed. If not, the transaction is aborted and the XRDC attributes are captured in error registers. If the transaction is allowed, XRDC attributes are removed from the transaction before being given to the appropriate peripheral or memory.

An overall controlling component, such as a hypervisor or operating system ("OS"), may decide that an active Domain does not meet the performance threshold and may be swapped for another processing Domain. Whilst this new Domain may use resources more efficiently, the original Domain may be more important in terms of safety or system performance. For example, if an SoC employing XRDC is used for automobiles, certain domains can be more important for the functioning of the automobile. Without a mechanism to define a priority level of a domain, a problem exists of allowing more important domains priority for their transactions or execution.

The inclusion of a Master Domain Priority Level ("MDPL") allows a system to define the priority level of a Domain. Domain hierarchy can be defined by the programmer to ensure that higher priority Domains are never negatively impacted by lower priority Domains. In cases where two Domains share a priority level, or if a core's overall controlling component is considering a context switch within a single Domain, the Sub Domain Priority Level ("SDPL") can be used to determine which Domain (associated with which virtual machine or application) should control the resources. This SDPL ensures that there is always a winner during priority evaluation, so long as there is no duplicate SDPL assignment within a single domain. This inclusion of a priority level can also be used to ensure that memory transactions are re-ordered based on their programmed priority level, so that transactions from higher priority Domains (such as higher priority virtual machines or applications) complete before lower priority transactions, via traffic management within the Network on Chip ("NoC"). This can ensure that safety-critical Domains (associated with safety critical virtual machines or applications) are not waiting on non-critical Domains to finish their current task.

A programmable register can be added to an existing XRDC module and programmed to define the priority level for each of the supported Domains on the device. The MDAC can then perform a look-up against this programmed register using its own DID field as an index, to find the MDPL which it can then assign to the transaction. A programmable SDPL field can also be added to the MDAC. With this SDPL, even if multiple Virtual Machines ("VMs") are included in a single Domain, each VM can have its own sub-priority level. Both the MDPL and SDPL can form part of the XRDC programming model, and can be additions to the existing XRDC attributes. In some embodiments, the prioritization is implemented and enforced in hardware, and configured by software, rather than being implemented exclusively by software. For both MDPL and SDPL, priority 0 can be the highest, and priority 15 can be the lowest, in some embodiments.

The added MDPL and SDPL attributes can be used by more than just memory transactions on the interconnect, according to some embodiments. The added MDPL and SDPL attributes can also be used at a higher level. For example, a performance monitor may be used by an OS to determine if a Domain is being throttled due to a lack of performance. In reaction, the overall controlling component (such as the hypervisor or operating system) may wish to change the resources associated with that Domain, which may affect other Domains that already have the new target resources included in their configuration. With the addition of this priority level, the modifications to the Domain can only be made if the priority level is higher, in some embodiments.

FIG. 1 is a block diagram of a processing system 100 in accordance with selected embodiments of the invention that includes an overall controlling component (such as a hypervisor or operating system) 102, and a master device 104 with two or more processor elements executing software components (such as virtual machines or applications) 106, 108, 110, 112. Each processor element executing a software component 106-112 can include all or at least a portion of processor element 114, memory 116 to store application or virtual machine software 118, domain configuration information including priority information 120, and input/output circuitry 122. The overall controlling component (such as a hypervisor or operating system) 102 can be connected directly or indirectly to an interconnect 124 to communicate with the domain access controller 126. Resources 130 are coupled to the domain access controller 126. Each resource may be assigned to a domain identifier as a member of a resource subgroup 132-138, according to the domain of the software components (such as the virtual machines or applications) 106-112 with which the resources 130 are associated. Domain assignments for the software components (such as the virtual machines or applications) 106-112 and resources 130 can be stored in memory 116, in the one or more files for domain configuration information 120.

Parameters that can be communicated between the overall controlling component (such as a hypervisor or operating system) 102 and the domain access controller 126 can include domain identifiers, peripheral addresses, and access attributes such as secure/nonsecure and privileged/nonprivileged attributes, as well as priority information, among others. Interconnect 124 also routes requests and responses between the software components (such as the virtual machines or applications) 106-112 and the domain access controller 126.

The overall controlling component (such as the hypervisor or operating system) 102 can create one or more software components (such as the virtual machines or applications) 106-112 in the processing system 100. Software components (such as virtual machines or applications) 106-112 are private execution environments run by the overall controlling component 102 and are referred to as domains. In the case of virtual machines, each of the software components 106-112 can run a different operating system simultaneously on processing system 100. Overall controlling component (such as a hypervisor or operating system) 102 can be implemented in hardware or in software that runs directly on hardware resources such as processor elements 114, memory 116, and input/output (I/O) interface circuitry 122. In the case of virtual machines, one of software components 106-112 may be a control domain that runs a full instance of an operating system, and the other domains may run a full instance of an operating system that may be different from the operating system running on the control domain or the other guest domains. Overall controlling component (such as a hypervisor or operating system) 102 partitions, shares, manages, and monitors the hardware resources and acts as an interface between the hardware resources and the domains. As such, overall controlling component 102 performs the low-level operations required to provide either an operating system or a virtualized platform. The control domain can perform all other tasks. For example, the control domain can determine which guest domains are created, which resources each guest domain can access, and how much memory is allocated to each guest domain.

Overall controlling component (such as a hypervisor or operating system) 102 can include a scheduler that schedules domains or applications onto processor elements 114. Each domain, including the control domain, can include one or more virtual processors that it owns and does not share with other domains. Overall controlling component 102 may be integrated with a bootloader or work in conjunction with the bootloader to help create the software components (such as virtual machines or applications) 106-112 during boot. The system firmware (not shown) can start the bootloader using a first processor element. The bootloader can load the domain configuration and priority information 120, kernel images and device trees from a boot partition in memory 116 for software components (such as the virtual machines or applications) 106-112. Overall controlling component 102 can then communicate domain information to domain access controller 126 before any of the software components (such as the virtual machines or applications) 106-112 in master device 102 are configured and begin operation. Using the overall controlling component 102 to supply domain configuration information 120 directly to domain access controller 126 before processor elements 114 start executing minimizes the opportunity for domains to be corrupted accidentally or intentionally. In addition, once the domain access controller 126 receives information such as domain identifiers for each resource, the domain access controller 126 can determine whether the domain identifiers for the sender and receiver match before passing a message along to the receiver. Note that the domain access controller 126 can check the domain identifiers for messages being received by resources 130 as well as messages being sent by resources 130. The ability to match domain identifiers for messages being sent from resources 130 also helps prevent corruption of software components (such as virtual machines or applications) 106-112. In addition to domain identifiers, domain access controller 126 can also check other domain configuration information or priorities 120 such as access rights, to determine whether messages can be passed to and from resources 130. The domain access controller 126 can also use the priority associated with the domain of the transaction to order transactions for the resources 130.

Once overall controlling component 102 shares domain configuration information 120 with domain access controller 126, overall controlling component 102 can then switch to an overall controlling component mode, initialize overall controlling component registers, and hand control over to a guest kernel. On the control core, overall controlling component 102 can then do the same for the guest that will run on the control core (i.e., initialize the data structures for the guest, switch to the overall controlling component mode, initialize overall controlling component registers, and hand off control to the guest kernel). After bootup, the distinction between a primary core and a secondary core may be ignored and overall controlling component 102 may treat the two cores equally.

Master device 104 may be implemented using a system on a chip (SoC) that includes multiple processing cores, referred to as a multi-core processor. For example, master device 104 can be implemented using a system-on-a-chip with an ARM architecture or any other architecture. In other embodiments, master device 104 may include a multi-core processor that is not a system-on-a-chip to provide the same or a similar environment. For example, a multi-core processor may be a general computing multi-core processor on a motherboard supporting multiple processing cores. In further embodiments, master device 104 may be implemented using a plurality of networked processing cores. In one embodiment, master device 104 may be implemented using a cloud computing architecture or other distributed computing architecture.

Processor elements 114 are virtualized elements that can each include one or more processing cores to perform calculations and general processing tasks, run application software 118, manage I/O interfaces 122, run operating systems, etc. Note that a single processing core can be shared among software components (such as virtual machines or applications) 106-112, and each software component 106-112 can use more than one processing core.

Domains associated with software components (such as virtual machines or applications) 106-112 can be configured for various purposes. For example, in an automobile, domain 106 may be used for a powertrain controller for resources that can include an engine, transmission, brakes, battery management system, steering, airbags, and suspension. Domain 108 may be used for a body controller for resources that can include HVAC, mirrors, interior lighting, doors, sears, steering wheel, sunroof, and windshield wipers. Domain 110 may be used for a cockpit controller for resources that can include touch displays and voice recognition amplifiers. Domain 112 may be used for a connectivity controller for resources that can include vehicle-to-everything, broadcast radio, cellular, WiFi, Bluetooth, near field communication, and smart car access components. Other domains and functionality can be implemented in processing system 100 for other purposes, with automotive domains being just one example.

In various embodiments, any number or type of domains may be supported (e.g., two domains, three domains, five domains, eight domains, . . . sixteen domains, etc.) in addition to or in place of the four domains enumerated herein. In selected embodiments, two or more different operating system environments are provided (e.g., one for each of the domains). Each of the operating system environments may be dedicated to different cores (or multiple cores) of a multi-core system-on-a-chip (SoC). Any number or type of operating environments may be provided, and may be used for devices and equipment other than automobiles.

Memory devices 116 can include one or more random access memory (RAM) devices, such as double data rate (DDR) RAM module, quad serial peripheral interface (QUADSPI) memory, system on-chip RAM modules, graphics on-chip RAM module, boot read only memory (ROM) module, and other suitable memory devices.

Application software 118 can be stored in memory 116 that is internal to an SoC, or in a memory device external to master device 104 and loaded into internal memory devices 116 during startup. Various types of application software 118 can be used, depending on the functions to be provided by processing system 100. Using the automotive example described above, application software 118 can include various controllers for resources 130, such as the powertrain domain controller, body domain controller, cockpit domain controller and connectivity domain controller. Other types of application software 188 can be used in addition to or instead of application software 118 related to automotive domains.

Domain configuration and priority information 120 is used by overall controlling component 102 to set up software components (such as virtual machines or applications) 106-112. The information can include, for example, the number of software components 106-112, physical core assignments to each virtual machine 106-112, temporal behavior to limit temporal interferences of multiple software components 106-112 among each other, connections via inter-virtual machine communication channels, access rights of software components 106-112 to resources 130, domain identifiers for components of software components 106-112 and resources devices 130, priority information for the software components 106-112, and overall controlling component security features for master device 104 and domain access control device 126. Other information can be included in domain configuration information 120 in addition to, or instead of, the foregoing information.

Input/output (I/O) circuitry 122 provides a connection between software components 106-112 and resources 130. I/O pins (not shown) are driven by pad drivers that provide for logic level translation, protection against potentially damaging static charges, and amplification of the internal signals to provide sufficient current drive to be useful outside master device 104. I/O circuitry 122 typically includes pads or pins connected to respective input pullup devices, electrostatic discharge protection, input buffers, level shifters, output drivers, and output pulldown devices. Other components can be included in I/O circuitry 122.

I/O circuitry 122 can be coupled to interconnect 124 either directly or through a network interface card (not shown). The connection between I/O circuitry 122, interconnect 124, and domain access control 126 can be wired or wireless. Any suitable interconnect technology can be used. For wired networks, an example of a suitable interconnect technology is Ethernet that allows multiple software components 106-112 to communicate with resources 130, and may be implemented using Ethernet cables plugged into an Ethernet switch, router, hub, network bridge, etc. Messages sent to and from the interconnect 124 can adhere to a protocol suitable for the interconnect technology being used. When using Ethernet, for example, a stream of data can be divided into frames or packets, also referred to as messages, that each include source and destination addresses, a payload, and error checking so damaged frames can be discarded and replacements retransmitted.

Domain access controller 126 sends and receives messages to and from master device 104 through interconnect 124. Upon receipt of a message, domain access controller 126 can extract data from the message including a destination address, domain identifier, and access rights. If the domain identifier and access rights match the information in domain configuration information 128 in domain access control 126 for the resource corresponding to the destination address, the message is routed to the corresponding resource. Note that the information in domain configuration information 128 may be a subset of the domain configuration information 120 in master device 104. A centralized domain access controller 126 can be implemented for use by all resources 130. Alternatively, some or all of resources 130 may have their own domain access controller to check whether the domain identifier and, optionally, access rights match. If the domain identifier in a message does not match the domain identifier for a particular resource device 130, the message may be discarded or the message may be flagged and an alert may be sent to overall controlling component 102, one of software components (such as virtual machines or applications) 106-112, or to a component external to processing system 100 for security or other purposes. The domain access controller 126 can also use the priority information 128 to prioritize particular higher-priority messages over other lower priority messages in accessing the resources 130.

As resources 130 receive data from external sources, there is potential for the data to include malicious software or other components from an external device that may try to gain control of master device 104 through information sent from resources 130 to master device 104. Thus, in addition to checking domain identifiers and, optionally, access rights, of messages sent to resources 130 by master device 104, domain access controller 126 can also check whether there is a match between domain identifiers and, optionally, access rights, of messages sent from resources 130 to master device 104. In this manner, data cannot be sent from one domain in resources 130 to another domain in master device 104.

One or more resources 130 may send data to or receive data from portable media devices, data storage devices, servers, mobile phones, radios for AM, FM and digital or satellite broadcast, etc. which are connected through connector hardware such as a one or more USB connectors, firewire connectors, lightning connectors, wireless communications connections for data transfer using infrared communication, Bluetooth communication, ZigBee communication, Wi-Fi communication, communication over a local area network or wireless local area network, etc.

Some resources 130 may be connected to one or more video connectors for the transmission of video data between devices/sources and processing system 100. For example, a video connector may follow a standard such as High-Definition Multimedia Interface (HDMI), Mobile High-definition Link (MHL), etc. The video connector may implement a standard using auxiliary processors, integrated circuits, memory, a mobile Industry Processor Interface, etc.

For automotive applications, one or more resources 130 may be connected to one or more Local Interconnect Networks (LIN) or Controller Area Networks (CAN) to allow communication between vehicle components. Vehicle sensors may be included in resources 130 such as one or more of gyroscopes, accelerometers, three dimensional accelerometers, inclinometers, thermometers, etc. Other resources 130 may be used, in addition to, or instead of, the resources devices 130 described herein.

Figure 2:
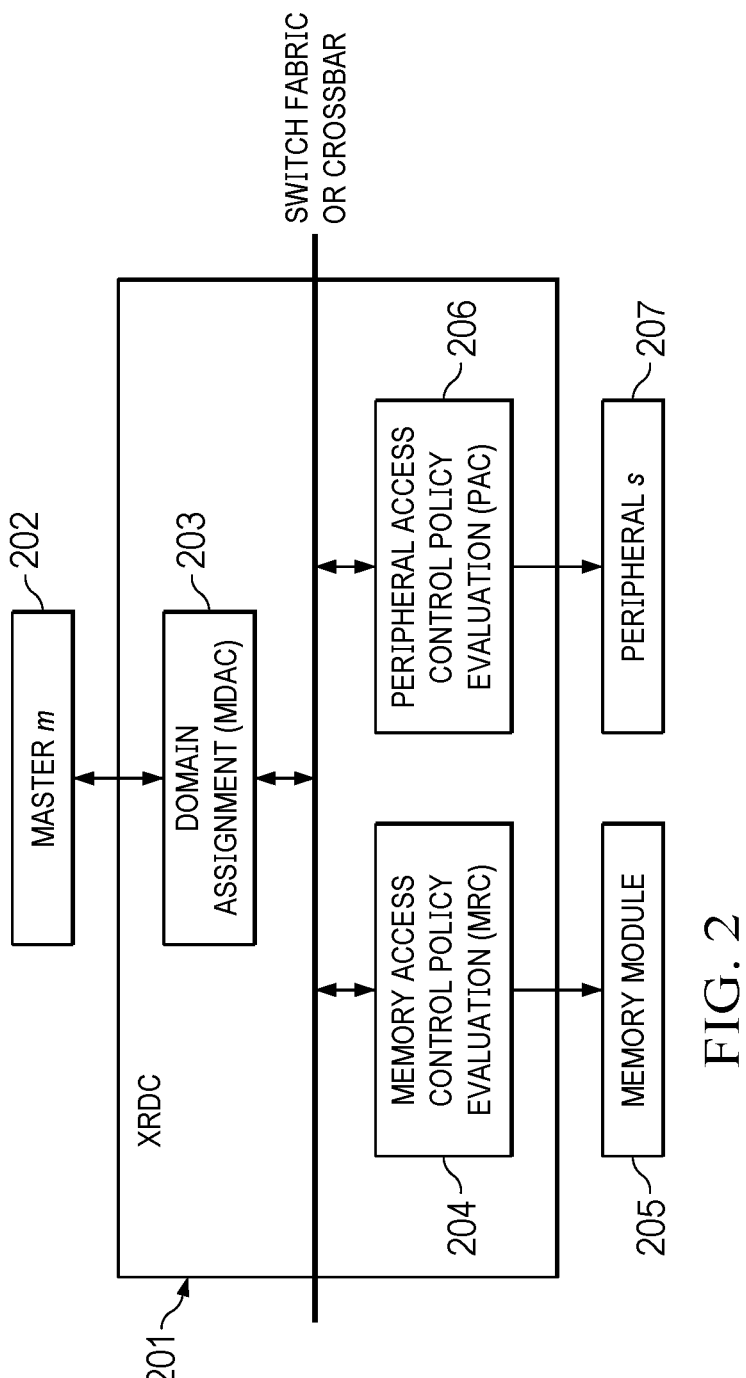
FIG. 2 illustrates a block diagram of an extended Resource Domain Controller ("XRDC") within a processing system, according to some embodiments.

FIG. 2 illustrates a block diagram of an extended Resource Domain Controller ("XRDC") 201 within a processing system, according to some embodiments. FIG. 2 depicts additional components for an XRDC system than what was depicted in FIG. 1. In FIG. 1. XRDC functionality was provided by the domain access controller (126). FIG. 2 depicts XRDC functionality having the following components: the Master Domain Assignment Controller ("MDAC" or "MDA")) 203, the Memory Region Controller ("MRC") 204, the Peripheral Domain Access Controller ("PAC" or "PDAC") 206, and an XRDC Manager. The XRDC 201 is a system that can manage access control, system memory protection and peripheral isolation, in some of these embodiments. The XRDC 201 can allow software to assign chip resources (e.g., non-core bus masters, memory regions and slave peripherals) to domains. These domains can have a defined access control policy for each privilege level. Applications can co-exist on same silicon with static firewall between them. Some example use cases for the XRDC are: (a) isolating real time and non-real time application elements; (b) isolating safety critical and non-safety critical code; and (c) isolating cores running third party untrusted from cores running trusted code base.

The XRDC 201 can also manage access control from bus masters (202) to system memory modules (205) and peripherals (207). The bus masters (202) are similar to the software components (106, 108, 110, 112) of master device 104 of FIG. 1. The system memory modules (205) and peripherals (207) of FIG. 2 are examples of resources (130) of FIG. 1. XRDC can be used to create logically isolated secure memory 205 (and peripherals 207). Bus Masters 202 attach to a domain. Bus Slaves (205, 207) support region descriptors and access control, based on the domain of access. While FIG. 1 depicts one or more domain access controllers (126), the XRDC of FIG. 2 can have the following components: the Master Domain Assignment Controller ("MDAC" or "MDA")) 203, the Memory Region Controller ("MRC") 204, the Peripheral Domain Access Controller ("PAC" or "PDAC") 206, and the XRDC Manager.

The MDAC submodule 203 assigns the programmed domain identifier ("DID") attribute and other attributes to every bus transaction from its associated master. The MDAC can do this based on a Master ID (fixed value per bus master), a Process ID, secure or privilege bits, and the priority of the associated domain associated with the DID. The MRC submodule 204 performs memory region access control for memory module 205. The MRC 204 enforces memory region access control policies based on the domain ID, a privilege or user state of transaction, and a secure/non-secure state of transaction. The MRC 204 can also use the priority associated with the domain of the transaction to order transactions for the memory module 205. The PAC 206 provides domain access control for all peripherals 207 connected to a single peripheral bus. The PAC Enforces peripheral access control policies based on: the Domain ID, the privilege or user state of a transaction, a secure/non-secure state of transaction. The PAC 206 can also use the priority associated with the domain of the transaction to order transactions for the peripherals 207. The XRDC Manager ("MGR") submodule (not shown) can coordinate programming model reads and writes. The MGR is usually not a programmable sub-module. The MGR can provide a register interface to the programming model.

Figure 3:
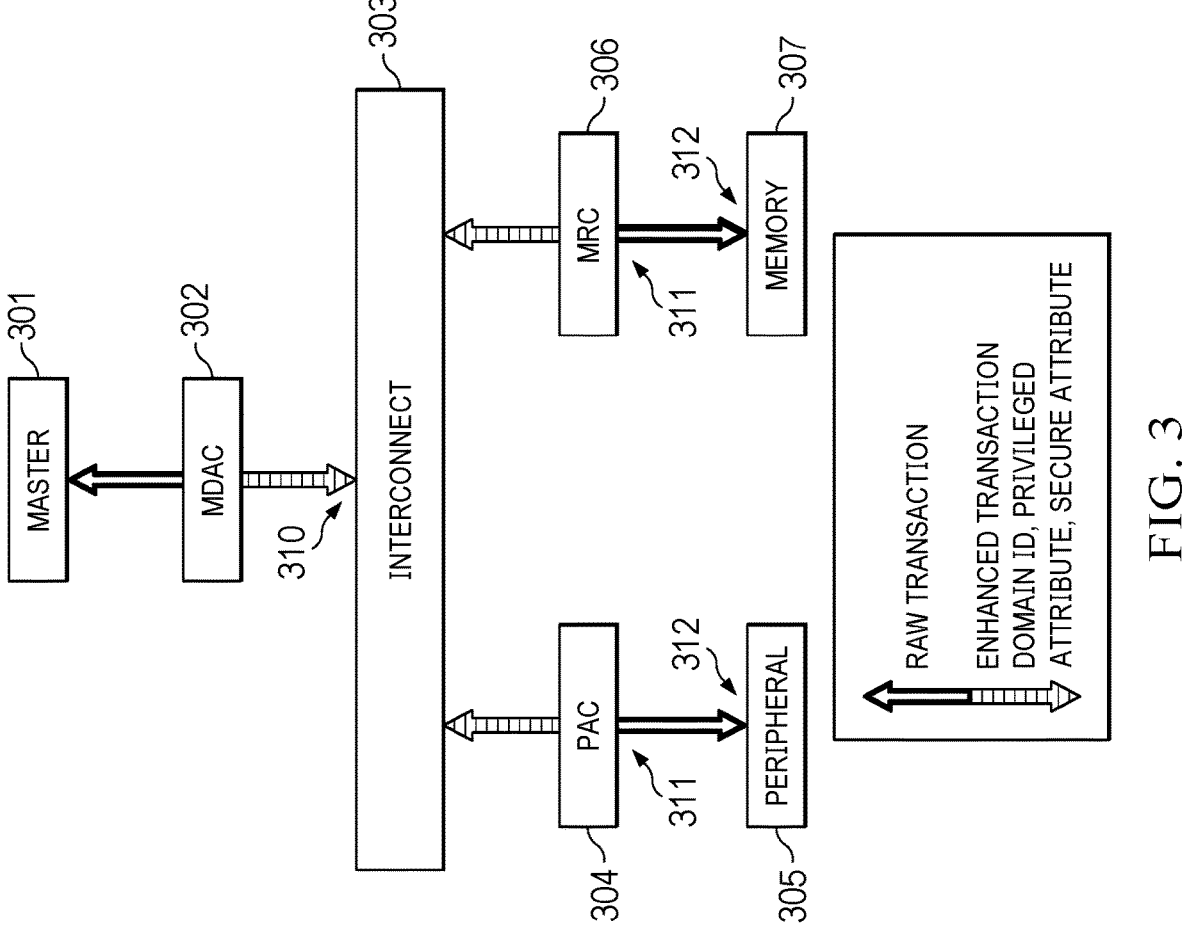
FIG. 3 illustrates further details of the operation of the XRDC within the processing system, according to some embodiments.

FIG. 3 illustrates further details of the operation of the XRDC within the processing system, according to some embodiments. FIG. 3 illustrates the operation of an example transaction within the XRDC system. First, a master 301 associated with a particular domain, that has a particular DID, creates a transaction to either a memory 307 or peripheral 305. The raw transaction is provided to the MDAC 302. At the MDAC 302, the XRDC information is added to the transaction, based on the programmed MDAC configuration. The enhanced transaction with a DID, privileged attribute, secure attribute, and an associated priority is provided to the interconnect 303.

The enhanced transaction is provided from the interconnect 303 to the PAC 304 or the MRC 306 based on the destination information in the transaction. The PAC 304 or MRC 306 examines the XRDC information and determines if the access is allowed or not. If the access is not allowed, the transaction is aborted and the XRDC information is captured in error registers. If the access is allowed, the XRDC information is removed and the transaction proceeds to the memory 307 or the peripheral 305.

Figure 4A:
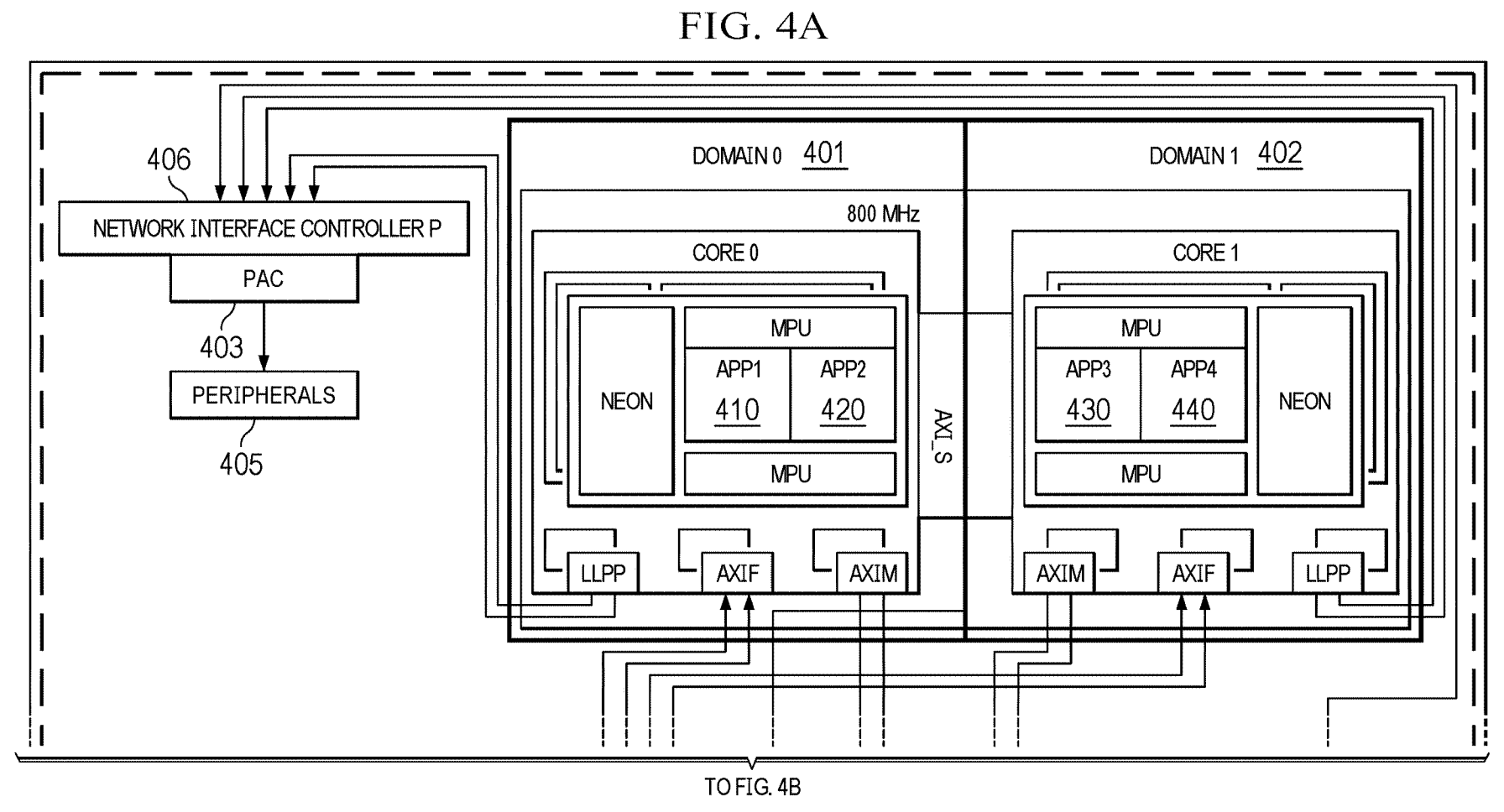
Figure 4B:
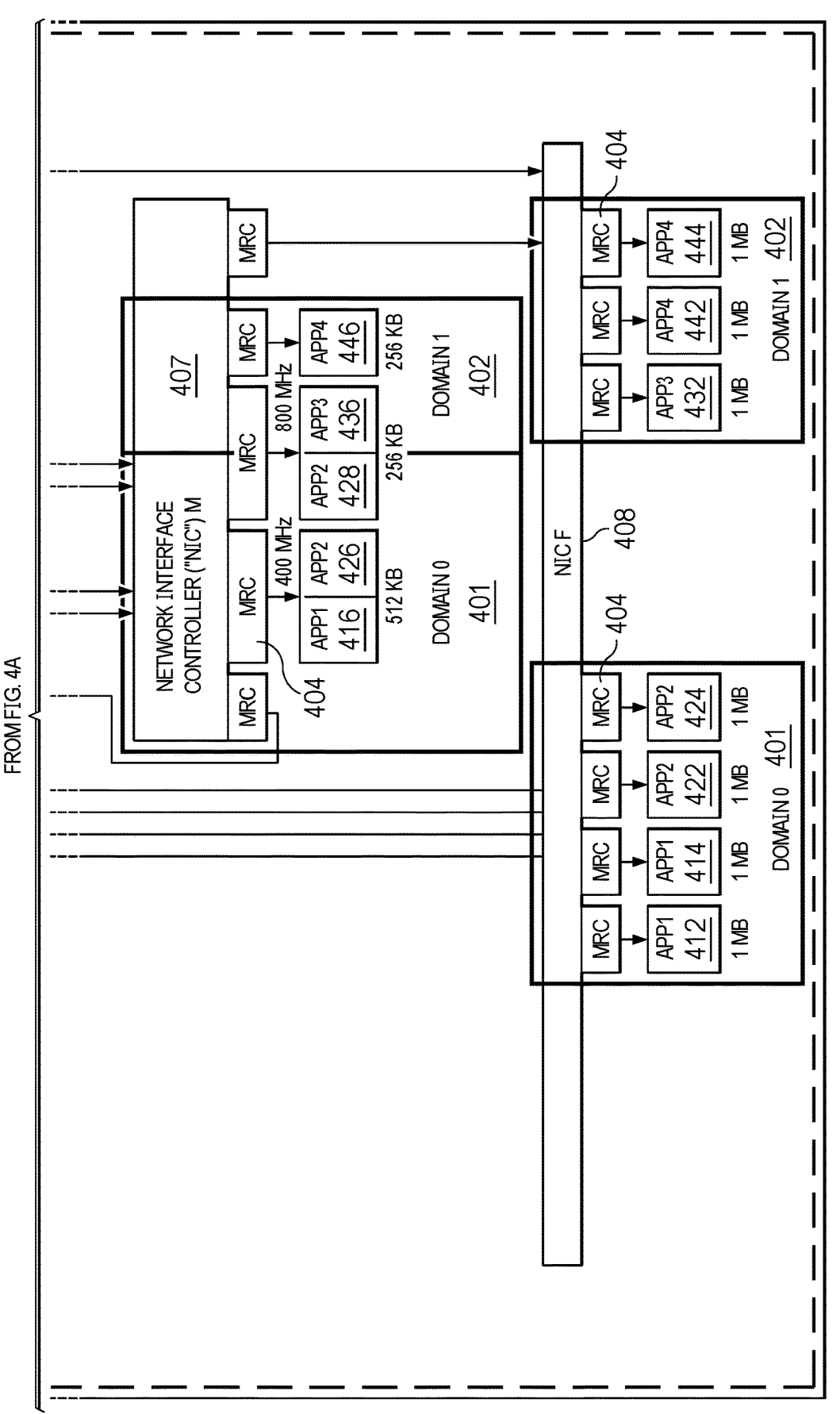

FIGS. 4A and 4B illustrate a block diagram of some components in an SoC, with some of the components grouped into two domains, according to some embodiments. The two domains are Domain 0 (401) and Domain 1 (402). FIG. 4A and FIG. 4B is just one example of an SoC that can implement XRDC, and the specific details shown in FIGS. 4A and 4B can easily change from SoC to SoC. Therefore, the specific details of the SoC in FIGS. 4A and 4B should not be construed as limiting. In FIG. 4A, each domain includes processor cores. Domain 0 (401) contains processor core 0, and Domain 1 (402) contains processor core 1. Each processor core has applications (or virtual machines depending on the embodiment) running on that processor core that is associated with that domain. For example, core 0 provides processing for App1 (410) and App2 (420), while core 1 provides processing for App3 (430) an App4 (440).

The processor core might be an advanced single instruction multiple data architecture such as an ARM® Neon® processor, in some embodiments. Each processor core can have various sizes of tightly coupled memory ("TCM"), instruction cache ("I-Cache") and data cache ("D-Cache") associated with it, as shown in FIG. 4A. Each processor core can have a microprocessor unit ("MPU") which can execute its associated applications. The processor cores can also have communication module that communicate with other parts of the SoC. For example, the Low Latency Peripheral Port ("LLPP") can communicate with peripherals through a network interface controller ("NIC") for the peripherals. In FIG. 4A, the NIC for peripherals is Network Interface Controller P 406. These peripherals have one or more Peripheral Domain Access Controller (PAC) 403 associated with them, in order to perform the XRDC functionality.

As another example, Advanced extensible Interface ("AXI") communication modules can facilitate communication between the processor cores and memory. AXI is an on-chip communication bus protocol. For example, AXIF can communicate with memory in an F-bank through NIC F 408 As another example, AXIM can communicate with memory in an M-bank through Network Interface Controller M 407 Each of the memory NICs have one or more Memory Region Controller ("MRC") 404 associated with them, in order to perform the XRDC functionality.

As shown in FIG. 4B, the M-bank of memory has memory assigned to the different applications in the different domains. The M-bank has memory associated with App1 (416), and memory associated with App2 (426, 428). Both the App1 memory (416) and the App2 memory (426, 428) are associated with Domain 0 (401). The M-bank also has memory associated with App3 (436) and App4 (446). Both the App3 memory (436) and the App4 memory (446) are associated with Domain 1 (402). In addition, the F-bank of memory also has memory assigned to the different applications in the different domains. The F-bank has memory associated with App1 (412, 414), and memory associated with App2 (422, 424). Both the App1 memory (412, 414) and the App2 memory 422, 424) are associated with Domain 0 (401). The M-bank also has memory associated with App3 (432) and App4 (442, 444). Both the App3 memory (432) and the App4 memory (442, 444) are associated with Domain 1 (402).

When a transaction is initiated, the MPU checks the address and privilege level of a transaction at the core. However, outside of the core, the MPU plays no role in isolation and no further checks are completed. Without the XRDC, software running on the core must be trusted to only access its intended memory/peripherals. The XRDC, on the other hand, checks the attributes of a transaction at the memory/peripheral itself. The software running on cores no longer needs to be trusted—it can be firewalled within its own Domain by the XRDC.

FIG. 4A shows two applications (or VMs depending on the embodiment) running on each core. If XRDC were disabled, for example, and only the MPUs are enforcing isolation, and if the two MPUs are correctly configured, then the apps would only access their own memory resources. For example, App 1 (410) would only access App 1 memory (412, 414, 416). App 2 (420) would only access App2 memory (422, 424, 426, 428). App3 (430) would only access App3 memory (432, 436). App4 (440) would only access App4 memory (44, 444, 446). Any attempted violations do not leave the core and a data abort is generated.

However, again assume that XRDC is disabled and only the MPUs are enforcing isolation. Assume now that the MPU of Core 1 is incorrectly configured, such that App3 (430) is trying to access App1's memory resource (416), for example. In this case, the incorrectly configured MPU allows the transaction to leave the core, and because there is no protection at the memory resource itself, App1's memory resource (416) is compromised.

With XRDC enabled, however, in the above example, App1's memory resource (416) is not compromised. Assume, again that the MPU of Core 1 is incorrectly configured, such that App3 (430) is trying to access App1's memory resource (416). The incorrectly configured MPU allows the transaction to leave the core, but because the MRC (404) of the XRDC checks the transaction at the memory resource itself, the access is denied. Regardless of its MPU configuration, any software running on Core 1 cannot access any memory/peripheral assigned to Domain 0 (401).

Figure 5:
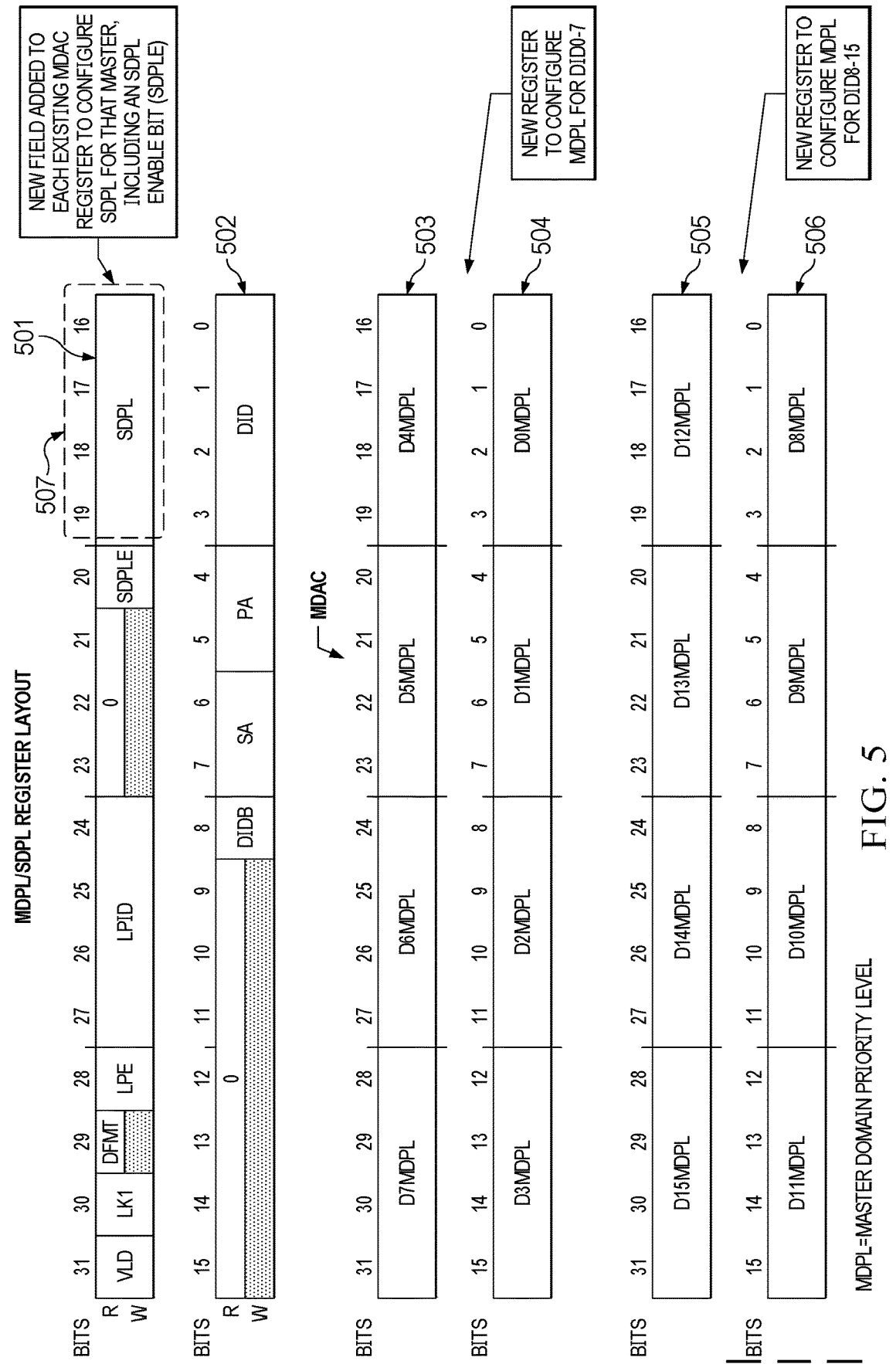
FIG. 5 illustrates a register configuration for the implementation of a Master Domain Priority Level ("MDPL") and a Sub Domain Priority Level ("SDPL") within an XRDC system.

FIG. 5 illustrates a register configuration for the implementation of a Master Domain Priority Level ("MDPL") and a Sub Domain Priority Level ("SDPL") within an XRDC system. Without any priority levels, an overall controlling component, such as a hypervisor or operating system ("OS") may decide that an active Domain does not meet the performance threshold and may be swapped for another processing Domain. Whilst this new Domain may use resources more efficiently, the original Domain may be more important in terms of safety or system performance. For example, if an SoC employing XRDC is used for automobiles, certain domains can be more important for the functioning of the automobile. Without a mechanism to define a priority level of a domain, a problem exists of allowing more important domains priority for their transactions or execution.

The inclusion of a Master Domain Priority Level ("MDPL") in registers 503, 504, 505, and 506 allows a system to define the priority level of a Domain. Domain hierarchy can be defined by the programmer to ensure that higher priority domains are never negatively impacted by lower priority domains. In cases where two domains share a priority level, or if a core's overall controlling component is considering a context switch within a single domain, the Sub Domain Priority Level ("SDPL") (507), which can be located within bits 16-19 of an MDAC register, can be used to determine which domain (associated with which virtual machine or application) should control the resources. This SDPL (507) ensures that there is always a winner during priority evaluation, so long as there is no duplicate SDPL assignment within a single domain. This inclusion of a priority level can also be used to ensure that memory transactions are re-ordered based on their programmed priority level, so that transactions from higher priority Domains (such as higher priority virtual machines or applications) complete before lower priority transactions, via traffic management within the Network on Chip ("NoC"). This can ensure that safety-critical domains (associated with safety critical virtual machines or applications) are not waiting on non-critical domains to finish their current task.

A programmable register (503, 504, 505, and 506) can be added to an existing XRDC module and programmed to define the priority level for each of the supported Domains on the device. The MDAC can then perform a look-up against this programmed register (503, 504, 505, and 506) using its own DID field as an index, to find the MDPL which it can then assign to the transaction. For example, "DOMDPL" in bits 3-0 of MDPL register 504 define the priority level for domain 0. As another example, "DIMDPL" in bits 7-4 of MDPL register 504 define the priority level for domain 1.

A programmable SDPL field (507) can also be added to the MDAC register (501, 502). With this SDPL (507), even if multiple Virtual Machines ("VMs") are included in single Domain, each VM can have its own sub-priority level. Both the MDPL (503, 504, 505, 506) and SDPL (507) can form part of the XRDC programming model, and can be additions to the existing XRDC attributes. In some embodiments, the prioritization is implemented and enforced in hardware, and configured by software, rather than being implemented exclusively by software. For both MDPL and SDPL, priority 0 can be the highest, and priority 15 can be the lowest, in some embodiments.

Figure 6A:
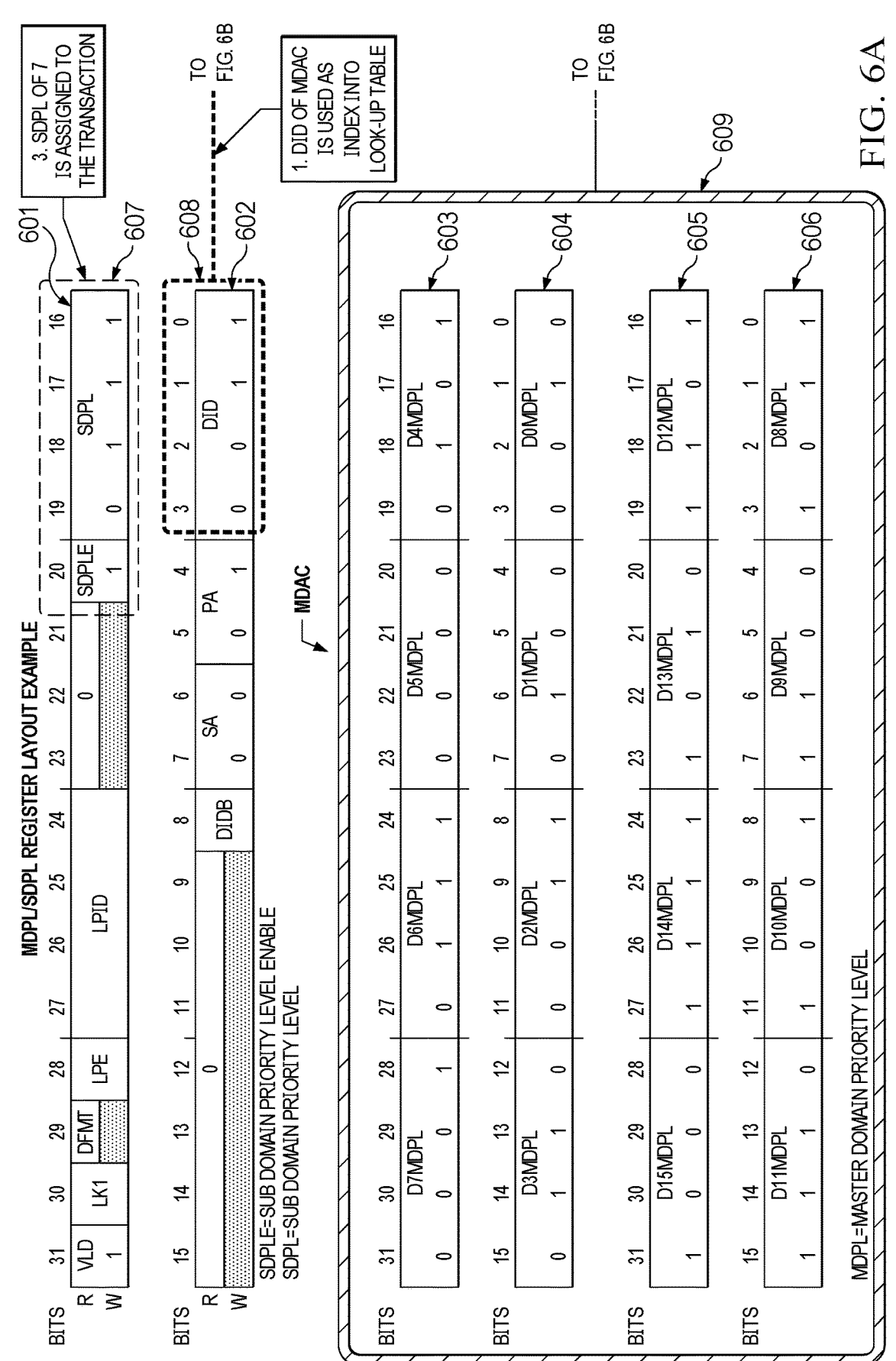
FIGS. 6A & 6B illustrate a specific example of an MDPL and SDPL register configuration, and how that register configuration translates into Domain Priority Levels for domains in an XRDC system, according to some embodiments.
Figure 6B:
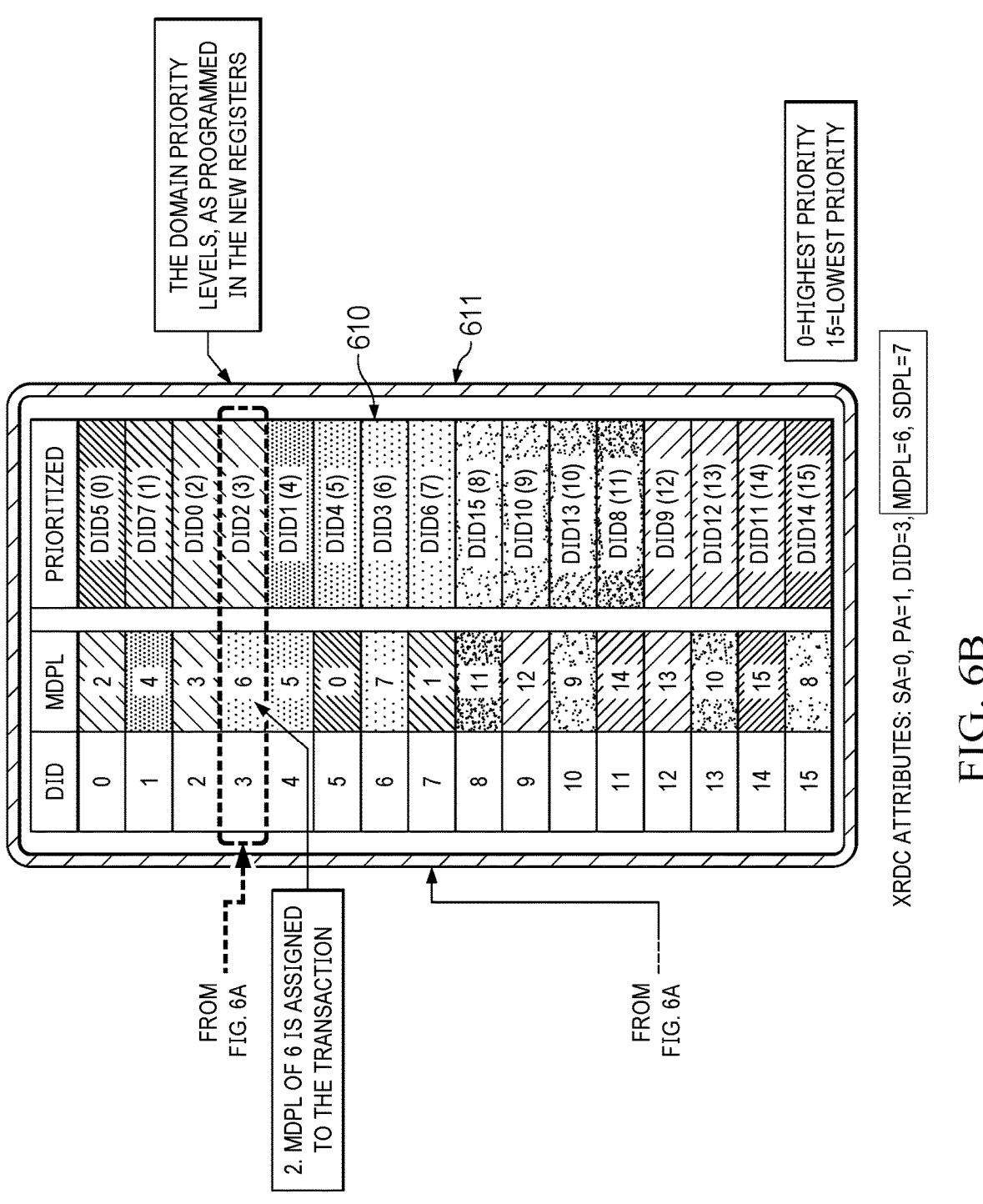

FIGS. 6A & 6B illustrate a specific example of an MDPL and SDPL register configuration, and how that register configuration translates into Domain Priority Levels for domains in an XRDC system, according to some embodiments. FIG. 6A shows the priority levels set for each of the 16 domains (Domain 0 through Domain 15) in the new MDPL registers (603, 604, 605, 606), together notated as 609. The priority levels of each of the domains can conceptually be thought of as a table (611) as shown in FIG. 6B. The DID (608) of MDAC register (602) is used as an index into the look-up table shown in FIG. 6B. MDAC register (602) contains a DID (608) for Domain 3. As the table (611) in FIG. 6B shows, Domain 3 has a MDPL priority level of "6." Therefore, an MDPL of 6 is assigned to the transaction, for this example.

The separate table (610) on the right-hand side of the tables (611) in FIG. 6B shows the domains displayed in prioritized order, for conceptual purposes. In table 610. Domain 5 (DID5) is the highest priority with an MDPL of 0. Domain 7 (DID7) is the second highest priority with an MDPL of 1. Domain 0 (DID0) is the third highest priority with an MDPL of 2. Domain 2 (DID2) is the fourth highest priority with an MDPL of 3, and so on. Tables 610 and 611 therefore conceptually show the domain priority levels, as programmed in the MDPL registers. The MDAC registers (601, 602) define the XRDC parameters for the transaction. As shown in FIG. 6A, the XRDC parameters define SA=0, PA=1, DID=3, and SDPL=7. Since the MDPL registers (609) define Domain 3 as having a priority level of "6", the MDPL of the transaction is set to "6."

Figure 7A:
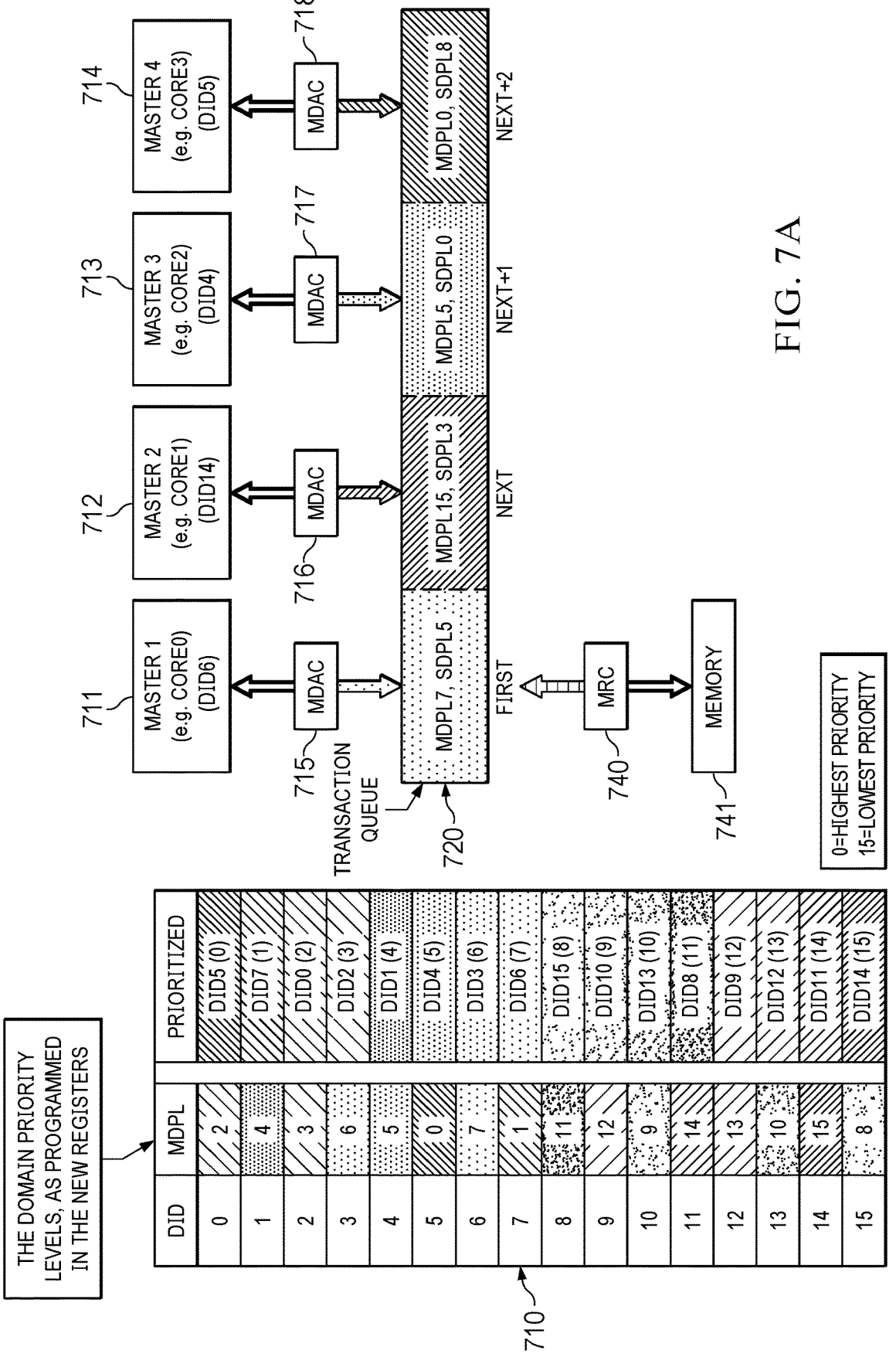
FIG. 7A illustrates a memory transaction reordering example of an XRDC system without use of the MDPL and SDPL registers, according to some embodiments.

FIG. 7A illustrates a memory transaction reordering example of an XRDC system without use of the MDPL and SDPL registers, according to some embodiments. In FIG. 7A, table 710 again displays the domain priority levels, as programmed in the MDAC and MDPL registers, similar to FIG. 6B. In the example of FIG. 7A, Master 1 (711) running on one of the processor cores, is assigned Domain 6. Master 2 (712) is assigned Domain 14. Master 3 (713) is assigned Domain 4. Master 4 (714) is assigned Domain 5. The example shows that each of the masters submit transactions to a memory, which are stored in a transaction queue (720). Without the MDPL/SDPL, memory transactions are completed in the order they are received.

Figure 7B:
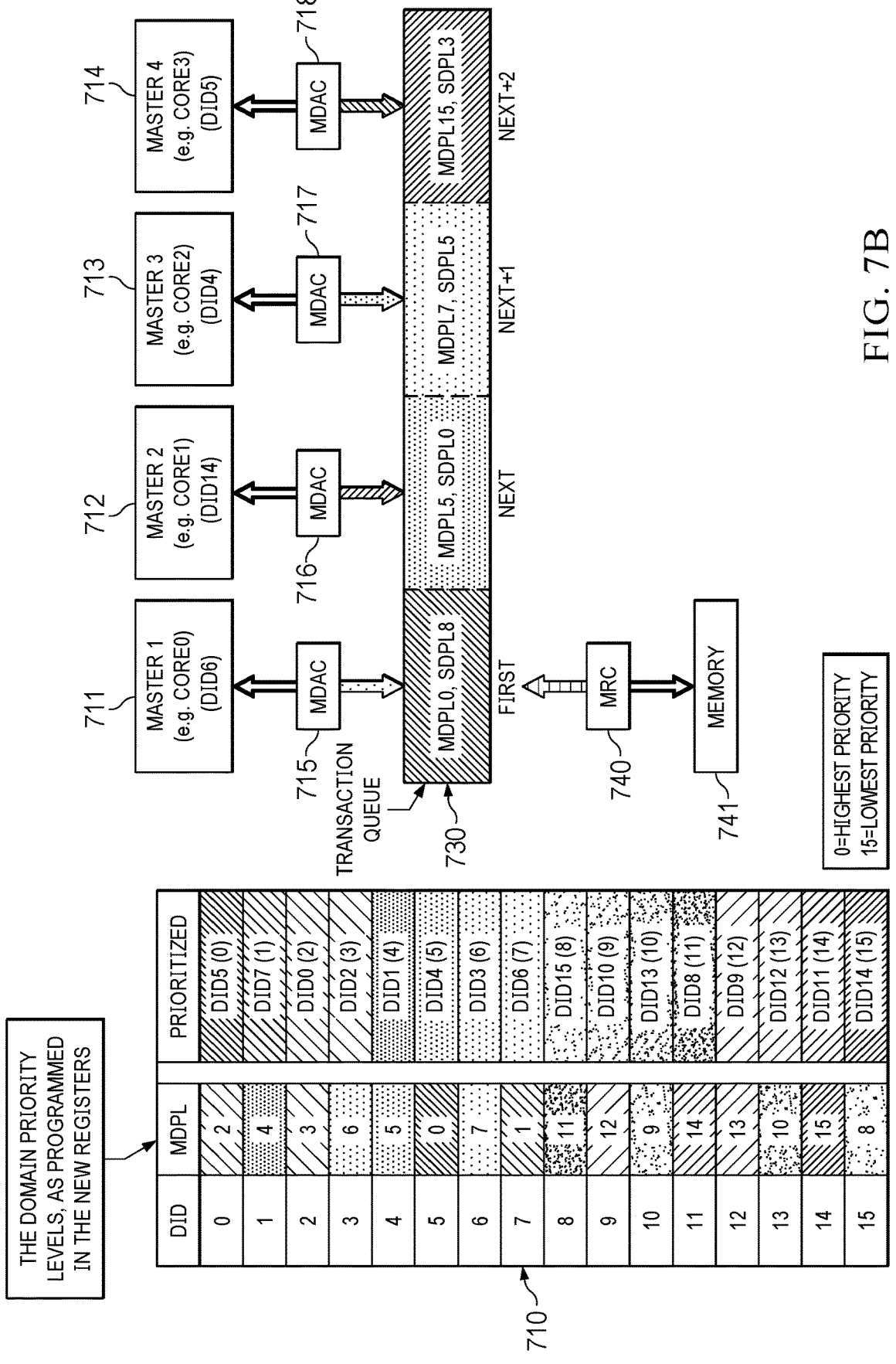
FIG. 7B illustrates a memory transaction reordering example of an XRDC system, using the MDPL and SDPL registers for transaction queue reordering, according to some embodiments.

FIG. 7B illustrates a memory transaction reordering example of an XRDC system, using the MDPL and SDPL registers for transaction queue reordering, according to some embodiments. Like FIG. 7A, table 710 again displays the domain priority levels, as programmed in the MDAC and MDPL registers, similar to FIG. 6B. In the example of FIG. 7A, Master 1 (711) running on one of the processor cores, is assigned Domain 6. Master 2 (712) running on another one of the processor cores is assigned Domain 14. Master 3 (713) running on another one of the processor cores is assigned Domain 4. Master 4 (714) running on another one of the processor cores is assigned Domain 5. The example shows that each of the masters submit transactions to a memory, which are stored in a transaction queue (730). With the MDPL/SDPL, however, the transaction queue (730) is re-ordered based on the priority level of the transaction. The transaction queue (730) is reordered such the transaction from Domain 5 with an MDPL of 0 is reordered by the MRC (740) as the first transaction to be serviced by the memory (741). The highest priority transaction (MDPL0, SDPL8) is completed first, followed by the next highest priority (MDPL5, SDPL0), and so on, until the queue is emptied in this fashion. If another memory transaction arrives with a higher priority Domain, then the queue is adjusted again.

Figure 8A:
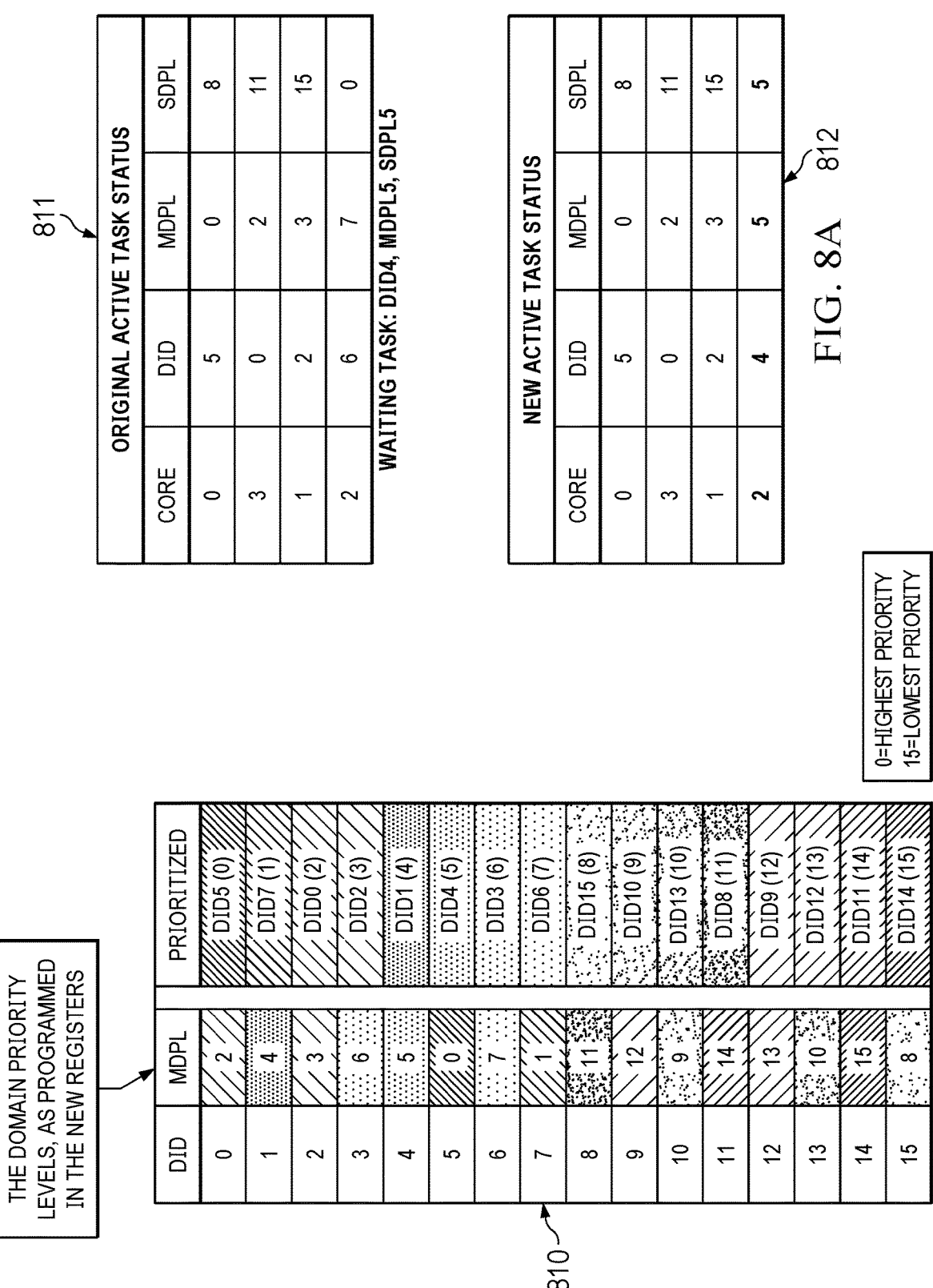
Figure 8B:
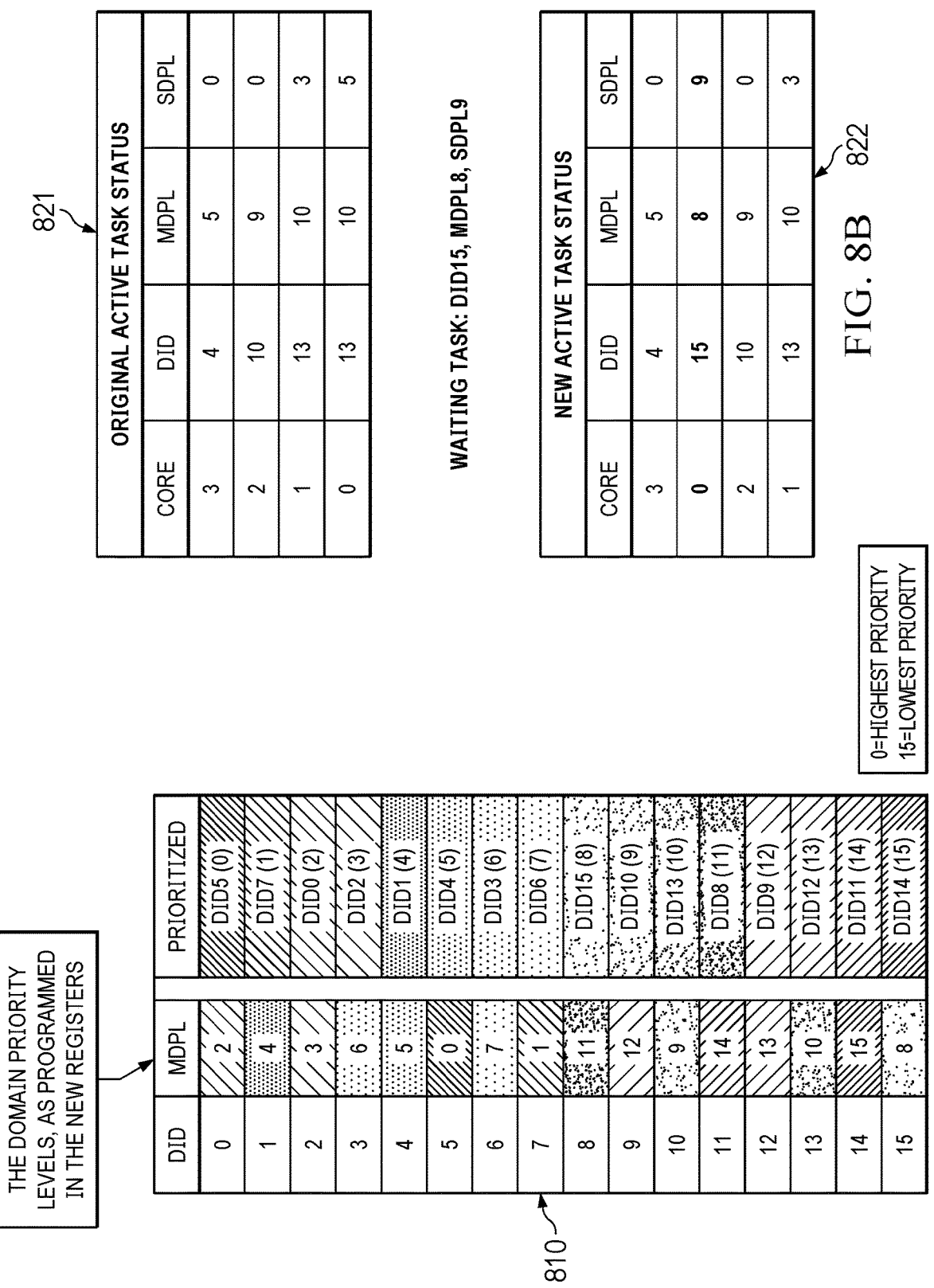

FIGS. 8A, 8B, and 8C illustrate context switch policing examples for potentially swapping higher priority tasks for current active tasks at processing cores, according to some embodiments. Like FIGS. 7A and 7B, table 810 again displays the domain priority levels, as programmed in the MDAC and MDPL registers, similar to FIG. 6B. The added MDPL and SDPL attributes can be used by more than just memory transactions on the interconnect. They can also be used at a higher level. For example, a performance monitor may be used by an OS or hypervisor to determine if a domain is being throttled due to a lack of performance. In reaction, the OS may wish to change the resources associated with that Domain, which may affect other Domains that already have the new target resources included in their configuration. With the addition of this priority level, the modifications to the Domain can instead be made if the priority level is higher.

In the "Original Active Task Status" of FIG. 8A, application (or virtual machine depending on the embodiment) with a DID5 is executing on processing core 0, application with a DID0 is executing on processing core 3, application with a DID2 is executing on processing core 1, and application with a DID6 is executing on processing core 2. In addition, Domain 5 has a MDPL of 0, Domain 0 has a MDPL of 2, Domain 2 has a MDPL of 3, and Domain 6 has a MDPL of 9. In addition, there is a waiting task from Domain 4 (DID4) with a MDPL of 5. The waiting task has a higher priority than the lowest active task {DID6, MDPL7, SDPL0}, so it can be made active. Therefore, this current lowest active task is swapped out as shown in the "New Active Task Status" table. In the "New Active Task Status" table, processor core is executing the application (or virtual machine depending on the embodiment) with {DID4, MDPL5, SDPL5} instead of the previous application (or virtual machine) it was previously executing of {DID6, MDPL7, SDPL0}.

In the "Original Active Task Status" of FIG. 8B, application (or virtual machine depending on the embodiment)

with a DID4 is executing on processing core 3, application with a DID10 is executing on processing core 2, application with a DID13 is executing on processing core 1, and another application with a DID13 is executing on processing core 0. In addition, Domain 4 has a MDPL of 5, Domain 10 has a MDPL of 9, and Domain 13 has a MDPL of 10. The task from DID13 executing on processing core 1 has {MDPL10, SDPL3}. The second task from DID13 executing on processing core 2 has {MDPL10, SDPL5}.

In addition, there is a waiting task from Domain 15 (DID15) with a MDPL of 8. The waiting task has a higher priority than the lowest active task {DID13, MDPL10, SDPL5}, so it can be "made active" and the current lowest active task (which has the lowest combined priorities considering both the MDPL and SDPL) is swapped out. Therefore, this current lowest active task is swapped out as shown in the "New Active Task Status" table. In the "New Active Task Status" table, processor core 0 is executing the application (or virtual machine depending on the embodiment) with {DID15, MDPL8. SDPL9} instead of the previous application (or virtual machine) it was previously executing of {DID13, MDPL10, SDPL5}.

In the "Original Active Task Status" of FIG. 8C, application (or virtual machine depending on the embodiment) with a DID0 is executing on processing core 2, application is a DID15 is executing on processing core 3, application with a DID8 is executing on processing core 1, and another application with a DID11 is executing on processing core 0. In addition, Domain 0 has a MDPL of 2, Domain 15 has a MDPL of 8, and Domain 8 has a MDPL of 11, and Domain 11 has an MDPL of 14.

In addition, there is a waiting task from Domain 14 (DID14) with a MDPL of 15. Since the waiting task has a lower priority MDPL value than the 4 tasks currently in execution, it must remain waiting. Therefore, the "New Active Task Status" table, is executing the same applications (or virtual machines depending on the embodiment) as the "Original Active Task Status" table.

Systems and methods for priority encoded domains in an SoC have been described. In an illustrative, non-limiting embodiment, an SoC may include: a core; and a domain access controller coupled to the core, where the domain access controller: receives a resource transaction request from a master device associated with a software-defined processing domain; and processes the resource transaction request, at least in part, based upon a priority level of the software-defined processing domain.

The SoC can also include a plurality of software-defined processing domains, where each of the plurality of software-defined processing domains is associated with a respective domain identifier and a respective priority level, and where the resource transaction request includes a domain identifier associated with the software-defined processing domain, in some embodiments. In some embodiments, the domain access controller determines, for the resource transaction request, at least one of: that the domain identifier of the resource transaction request matches a domain identifier of a resource to which the resource transaction request is addressed; or that access rights of one of the software-defined processing domain matches access rights of the resource.

The domain access controller, in some embodiments, receives a plurality of resource transaction requests, including the resource transaction request, associated with a plurality of software-defined processing domains, including the software-defined processing domain, and addressed to a resource coupled to the domain access controller, where each software-defined processing domain is associated with a respective priority level. In order to process the resource transaction request based upon the priority level of the software-defined processing domain, the domain access controller may, in some embodiments, order the plurality of resource transaction requests based upon the associated respective priority levels, and provide the resource transaction requests to the resource based on the order. In some embodiments, the resource includes a memory resource or a remote peripheral resource, and the resource transaction requests include memory transactions or access requests for the remote peripheral.

In some embodiments, the SoC further includes a plurality of cores and a hypervisor, where the plurality of software-defined processing domains include a plurality of virtual machines, and where the hypervisor is configured to allocate the plurality of virtual machines to the plurality of cores according to a corresponding priority level of each respective virtual machine. In some of these embodiments, the hypervisor may: determine that a first virtual machine of the plurality of virtual machines awaits access to one of the plurality of cores, determine that a first priority level associated with the first virtual machine is greater than a second priority level associated with a second virtual machine of the plurality of virtual machines currently allocated to a first core of the plurality of cores, deallocate, from the first core, the second virtual machine whose associated second priority level is less than the first priority level associated with the first virtual machine, and allocate the first virtual machine to the first core.

In some embodiments, the SoC further includes a plurality of cores and an operating system, where the plurality of software-defined processing domains include a plurality of applications managed by the operating system, and where the operating system is configured to allocate the plurality of applications to the plurality of cores according to a corresponding priority level of each of the applications. In some of these embodiments, the operating system: determines that a first application of the plurality of applications awaits access to one of the plurality of cores, determines that a first priority level associated with the first application is greater than a second priority level associated with a second application of the plurality of applications currently allocated to a first core the plurality of cores, deallocates, from the first core, the second application whose associated second priority level is less than the first priority level associated with the first application, and allocates the first application to the first core.

In some embodiments the SoC further includes a plurality of resources, where a distinct domain access controller is coupled to each of the plurality of resources. In some embodiments, the SoC further includes a plurality of resources, where each domain identifier for each of the plurality of software-defined processing domains is associated with one or more of the resources. In some embodiments, the master device includes a memory configured to store the respective domain identifier and the respective priority priority level for each of the plurality of software-defined processing domains. In some embodiments, the SoC further includes a plurality of cores, where at least two of the plurality of cores are configured to execute different operating systems In other embodiments, a method includes: receiving, at a domain access controller, a plurality of resource transactions issued by a plurality of master devices, where each of the plurality of master devices is associated with a respective one of a plurality of software-defined processing domains, and where each of the plurality of software-defined processing domains is associated with a priority attribute; re-ordering the plurality of resource transactions, by the domain access controller, based upon the priority attributes; and executing the re-ordered resource transactions.

In some embodiments, each resource transaction of the received plurality of resource transactions further indicates a domain identifier of the corresponding software-defined processing domain that sent that resource transaction. In some of these embodiments, the executing the re-ordered resource transactions further includes, for each resource transaction, at least one of: determining, by the domain access controller, that the domain identifier of the resource transaction matches a domain identifier of a given resource addressed by the resource transaction; or determining, by the domain access controller, that access rights of the corresponding software-defined processing domain that sent that resource transaction to the given resource matches access rights of the given resource.

In some embodiments, the plurality of software-defined processing domains include a plurality of virtual machines. In some of these embodiment, the method includes allocating, by a hypervisor, the plurality of virtual machines to a plurality of cores according to the priority attributes of the plurality of software-defined processing domains. In some embodiments, the plurality of software-defined processing domains include a plurality of applications. In some of these embodiments, the method includes allocating, by an operating system, the plurality of applications to a plurality of cores according to the priority attributes of the plurality of software-defined processing domains.

In other embodiments, a system, includes: a plurality of processing cores; and a memory coupled to at least one of the plurality of processing cores, where the memory has program instructions stored thereon that, upon execution by one or more of the processing cores, cause the system to execute a hypervisor to: access domain information in a master device, the domain information including a plurality of domain identifiers and a plurality of priority levels, each of the domain identifiers and priority levels associated with a respective one of a plurality of virtual machines; and allocate each of the plurality of virtual machines to a respective one of the plurality of processing cores according to the priority levels.

In some embodiments, the system includes: a domain access controller coupled to an interconnect; and a plurality of resources connected to the domain access controller via the interconnect, where: (a) the hypervisor is configured to provide the domain identifiers to the domain access controller, where the domain access controller is coupled to the interconnect between the hypervisor and the plurality of resources; and (b) the domain access controller includes at least one message queue for one or more of the plurality of resources. In some of these embodiments, the domain access controller is configured to: determine whether domain identifiers in messages from the virtual machines match domain identifiers of any of the one or more resources; and allow the messages to pass to the at least one message queue in response to the domain identifiers matching domain identifiers of any of the one or more resources. In some embodiments, the domain access controller is further configured to: determine a priority level associated with each of the allowed messages; determine an order for the allowed messages according to associated priority levels; and provide the allowed messages to the resource in the determined order.

CONCLUSION

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined circuits or logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A System-on-Chip (SoC), comprising:

a core;

a domain access controller coupled to the core, wherein the domain access controller is configured to:

receive a resource transaction request from a master device associated with a software-defined processing domain; and process the resource transaction request, at least in part, based upon a priority level of the software-defined processing domain;

a plurality of software-defined processing domains, wherein each of the plurality of software-defined processing domains is associated with a respective domain identifier and a respective priority level, and wherein the resource transaction request comprises a domain identifier associated with the software-defined processing domain;

a plurality of cores and a hypervisor, wherein the plurality of software-defined processing domains comprise a plurality of virtual machines, and wherein the hypervisor is configured to allocate the plurality of virtual machines to the plurality of cores according to a corresponding priority level of each respective virtual machine, wherein the hypervisor is further configured to:

determine that a first virtual machine of the plurality of virtual machines awaits access to one of the plurality of cores;

determine that a first priority level associated with the first virtual machine is greater than a second priority level associated with a second virtual machine of the plurality of virtual machines currently allocated to a first core of the plurality of cores;

deallocate, from the first core, the second virtual machine whose associated second priority level is less than the first priority level associated with the first virtual machine; and allocate the first virtual machine to the first core.

2. The SoC of claim 1, wherein the domain access controller is further configured to determine, for the resource transaction request, at least one of:

that the domain identifier of the resource transaction request matches a domain identifier of a resource to which the resource transaction request is addressed; or that access rights of one of the software-defined processing domain matches access rights of the resource.

3. The SoC of claim 1, wherein the domain access controller is further configured to:

receive a plurality of resource transaction requests, including the resource transaction request, associated with a plurality of software-defined processing domains, including the software-defined processing domain, and addressed to a resource coupled to the domain access controller, wherein each software-defined processing domain is associated with a respective priority level; and wherein to process the resource transaction request, at least in part, based upon the priority level of the software-defined processing domain, the domain access controller is further configured to:

order the plurality of resource transaction requests based upon the associated respective priority levels; and provide the resource transaction requests to the resource based on the order.

4. The SoC of claim 3, wherein the resource comprises a memory resource or a remote peripheral resource, and wherein the resource transaction requests comprise memory transactions or access requests for the remote peripheral.

5. The SoC of claim 1, further comprising a plurality of resources, wherein a distinct domain access controller is coupled to each of the plurality of resources.

6. The SoC of claim 1, further comprising a plurality of resources, wherein each domain identifier for each of the plurality of software-defined processing domains is associated with one or more of the resources.

7. The SoC of claim 1, wherein the master device comprises a memory configured to store the respective domain identifier and the respective priority level for each of the plurality of software-defined processing domains.

8. The SoC of claim 1, further comprising a plurality of cores, wherein at least two of the plurality of cores are configured to execute different operating systems.

9. A System-on-Chip (SoC), comprising:
a core;
a domain access controller coupled to the core, wherein the domain access controller is configured to:
receive a resource transaction request from a master device associated with a software-defined processing domain; and
process the resource transaction request, at least in part, based upon a priority level of the software-defined processing domain;
a plurality of software-defined processing domains, wherein each of the plurality of software-defined processing domains is associated with a respective domain identifier and a respective priority level, and wherein the resource transaction request comprises a domain identifier associated with the software-defined processing domain; and
a plurality of cores and an operating system, wherein the plurality of software-defined processing domains comprise a plurality of applications managed by the operating system, and wherein the operating system is configured to allocate the plurality of applications to the plurality of cores according to a corresponding priority level of each of the applications, wherein the operating system is further configured to:
determine that a first application of the plurality of applications awaits access to one of the plurality of cores;
determine that a first priority level associated with the first application is greater than a second priority level associated with a second application of the plurality of applications currently allocated to a first core the plurality of cores;
deallocate, from the first core, the second application whose associated second priority level is less than the first priority level associated with the first application; and
allocate the first application to the first core.

10. The SoC of claim 9, wherein the domain access controller is further configured to determine, for the resource transaction request, at least one of:
that the domain identifier of the resource transaction request matches a domain identifier of a resource to which the resource transaction request is addressed; or that access rights of one of the software-defined processing domain matches access rights of the resource.

11. The SoC of claim 9, wherein the domain access controller is further configured to:
receive a plurality of resource transaction requests, including the resource transaction request, associated with a plurality of software-defined processing domains, including the software-defined processing domain, and addressed to a resource coupled to the domain access controller, wherein each software-defined processing domain is associated with a respective priority level; and
wherein to process the resource transaction request, at least in part, based upon the priority level of the software-defined processing domain, the domain access controller is further configured to:
order the plurality of resource transaction requests based upon the associated respective priority levels; and
provide the resource transaction requests to the resource based on the order.

12. The SoC of claim 11, wherein the resource comprises a memory resource or a remote peripheral resource, and wherein the resource transaction requests comprise memory transactions or access requests for the remote peripheral.

13. The SoC of claim 9, further comprising a plurality of resources, wherein a distinct domain access controller is coupled to each of the plurality of resources.

14. The SoC of claim 9, further comprising a plurality of resources, wherein each domain identifier for each of the plurality of software-defined processing domains is associated with one or more of the resources.

15. The SoC of claim 9, wherein the master device comprises a memory configured to store the respective domain identifier and the respective priority level for each of the plurality of software-defined processing domains.

16. The SoC of claim 9, further comprising a plurality of cores, wherein at least two of the plurality of cores are configured to execute different operating systems.

17. A system, comprising:
a plurality of processing cores;
a memory coupled to at least one of the plurality of processing cores, wherein the memory has program instructions stored thereon that, upon execution by one or more of the processing cores, cause the system to execute a hypervisor to:
access domain information in a master device, the domain information comprising a plurality of domain identifiers and a plurality of priority levels, each of the domain identifiers and priority levels associated with a respective one of a plurality of virtual machines; and
allocate each of the plurality of virtual machines to a respective one of the plurality of processing cores according to the priority levels;
a domain access controller coupled to an interconnect; and
a plurality of resources connected to the domain access controller via the interconnect, wherein:
(a) the hypervisor is configured to provide the domain identifiers to the domain access controller, wherein the domain access controller is coupled to the interconnect between the hypervisor and the plurality of resources; and (b) the domain access controller comprises at least one message queue for one or more of the plurality of resources, wherein the domain access controller is configured to:

determine whether domain identifiers in messages from the virtual machines match domain identifiers of any of the one or more resources; and allow the messages to pass to the at least one message queue in response to the domain identifiers matching domain identifiers of any of the one or more resources.

18. The system of claim 17, wherein the domain access controller is further configured to:

determine a priority level associated with each of the allowed messages;

determine an order for the allowed messages according to associated priority levels; and provide the allowed messages to the resource in the determined order.

\* \* \* \* \*